US009958911B2

(12) United States Patent
Alvarado et al.

(10) Patent No.: US 9,958,911 B2
(45) Date of Patent: May 1, 2018

(54) 1U TO NXU EXPANDABLE SERVER CHASSIS USING INTERCHANGEABLE FLEXIBLE COVERS OF VARYING SIZE

(71) Applicant: DELL PRODUCTS, L.P., Round Rock, TX (US)

(72) Inventors: Daniel Alvarado, Pflugerville, TX (US); Edmond I. Bailey, Cedar Park, TX (US); Walter R. Carver, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 19 days.

(21) Appl. No.: 14/675,284

(22) Filed: Mar. 31, 2015

(65) Prior Publication Data
US 2016/0291645 A1  Oct. 6, 2016

(51) Int. Cl.
*G06F 1/18* (2006.01)

(52) U.S. Cl.
CPC .................................. *G06F 1/183* (2013.01)

(58) Field of Classification Search
CPC .. H05K 7/1487; H05K 7/1489; H05K 7/1492; H05K 7/183; H05K 5/0217; H05K 7/1488; H05K 7/18; H05K 5/02; H05K 5/0204; H05K 5/0239; H05K 7/14; H05K 7/1422; H05K 7/1485; H05K 7/20709; H05K 9/0062; G06F 1/181; G06F 1/187; G06F 1/183; G06F 1/188; G06F 1/16; G06F 1/1656; G06F 1/189; G11B 33/02
See application file for complete search history.

(56) References Cited

U.S. PATENT DOCUMENTS

| | | | |
|---|---|---|---|
| 3,005,282 A | 10/1961 | Godtfred | |
| 4,597,291 A * | 7/1986 | Motomiya | H05K 7/1478 361/736 |
| 5,229,919 A | 7/1993 | Chen | |
| 5,349,483 A | 9/1994 | Tsai | |
| 5,650,911 A | 7/1997 | Scholder et al. | |

(Continued)

OTHER PUBLICATIONS

EIC stic search, Jul. 24, 2017.*

(Continued)

*Primary Examiner* — James Wu
*Assistant Examiner* — Michael Matey
(74) *Attorney, Agent, or Firm* — Isidore PLLC

(57) ABSTRACT

An Information Handling System (IHS) includes a chassis having a base panel, a selected modular cover, and a latching structure. The base panel has an upper chassis surface to receive selected compute components and infrastructure components that vary in height desired for the fully assembled IHS or rack in which the IHS will be inserted. The selected modular cover can have peripheral sides of a vertical height to complement a vertical height of the lateral guides of the base panel to create either a first height enclosure of a first height to house compute components of less than the first height or a second height enclosure of a second height to house compute components of less than the second height but greater than the first height. The latching structure is formed between the peripheral sides of the selected one of the first and second modular cover and the lateral guides of the base panel.

11 Claims, 4 Drawing Sheets

(56) References Cited

U.S. PATENT DOCUMENTS

| | | | |
|---|---|---|---|
| 5,680,293 A | 10/1997 | McAnally et al. | |
| 5,687,059 A * | 11/1997 | Hoppal | G11B 33/128 |
| | | | 361/679.31 |
| 5,734,557 A | 3/1998 | McAnally et al. | |
| 5,783,771 A * | 7/1998 | Copeland | H05K 9/0073 |
| | | | 174/365 |
| 5,858,509 A | 1/1999 | Polch et al. | |
| 5,865,518 A | 2/1999 | Jarrett et al. | |
| 5,967,633 A | 10/1999 | Jung | |
| 5,995,365 A | 11/1999 | Broder et al. | |
| 6,122,165 A | 9/2000 | Schmitt et al. | |
| 6,125,031 A | 9/2000 | Fiora et al. | |
| 6,195,262 B1 * | 2/2001 | Bodette | G06F 1/18 |
| | | | 361/728 |
| 6,201,702 B1 | 3/2001 | Schmitt | |
| 6,297,962 B1 | 10/2001 | Johnson et al. | |
| 6,349,353 B1 | 2/2002 | Lewis et al. | |
| 6,351,375 B1 | 2/2002 | Hsieh et al. | |
| 6,404,642 B1 | 6/2002 | Greenfield et al. | |
| 6,496,366 B1 | 12/2002 | Coglitor et al. | |
| 6,580,604 B1 | 6/2003 | McAnally et al. | |
| 6,600,648 B2 | 7/2003 | Curlee et al. | |
| 6,625,033 B1 * | 9/2003 | Steinman | H05K 7/20581 |
| | | | 174/382 |
| 6,674,641 B2 | 1/2004 | Jensen et al. | |
| 6,675,976 B2 * | 1/2004 | Steinman | H04Q 1/10 |
| | | | 211/26 |
| 6,788,542 B2 | 9/2004 | Rumney | |
| 6,826,048 B1 | 11/2004 | Dean et al. | |
| 6,839,233 B2 | 1/2005 | Cravens et al. | |
| 6,851,925 B2 | 2/2005 | Chuang | |
| 6,854,174 B2 | 2/2005 | Jiang | |
| 6,906,918 B2 | 6/2005 | Rabinovitz | |
| 7,123,474 B2 | 10/2006 | Cho | |
| 7,151,672 B2 | 12/2006 | Campbell | |
| 7,245,490 B2 | 7/2007 | Chou et al. | |
| 7,259,962 B2 | 8/2007 | Chen | |
| 7,262,958 B2 | 8/2007 | Marroquin et al. | |
| 7,453,707 B2 | 11/2008 | Beall et al. | |
| 7,483,264 B2 | 1/2009 | Chen et al. | |
| 7,545,636 B2 | 6/2009 | Wobig et al. | |
| 7,580,260 B2 | 8/2009 | Figuerado | |
| 7,589,966 B2 | 9/2009 | Ong et al. | |
| 7,606,044 B2 | 10/2009 | Bailey et al. | |
| 7,623,344 B2 | 11/2009 | Beall et al. | |
| 7,639,486 B2 | 12/2009 | Champion et al. | |
| 7,821,790 B2 | 10/2010 | Sharma et al. | |
| 7,845,903 B2 | 12/2010 | Li | |
| 7,909,312 B2 | 3/2011 | Ogata | |
| 7,930,812 B2 * | 4/2011 | Curnalia | H05K 7/1489 |
| | | | 211/183 |
| 8,045,339 B2 | 10/2011 | Pav | |
| 8,054,645 B2 * | 11/2011 | Ikeda | H05K 7/1461 |
| | | | 361/802 |
| 8,116,076 B2 | 2/2012 | Cochrane | |
| 8,363,414 B2 | 1/2013 | Peng et al. | |
| 8,411,432 B1 | 4/2013 | Zimlin et al. | |
| 8,427,828 B2 * | 4/2013 | Kehret | G06F 1/183 |
| | | | 165/104.33 |
| 8,437,133 B2 | 5/2013 | Bhutani et al. | |
| 8,451,600 B1 | 5/2013 | Ross | |
| 8,665,590 B2 | 3/2014 | Wang | |
| 8,755,192 B1 * | 6/2014 | Schrempp | G06F 1/20 |
| | | | 361/679.5 |
| 8,757,739 B2 | 6/2014 | Chen et al. | |
| 8,787,013 B1 * | 7/2014 | Czamara | G06F 1/20 |
| | | | 361/676 |
| 8,787,038 B2 * | 7/2014 | Wang | H04B 10/00 |
| | | | 174/350 |
| 2003/0016504 A1 | 1/2003 | Raynham | |
| 2005/0185370 A1 | 8/2005 | Chung | |
| 2005/0257232 A1 * | 11/2005 | Hidaka | G11B 33/126 |
| | | | 720/654 |
| 2006/0120040 A1 | 6/2006 | Chen | |
| 2006/0120041 A1 | 6/2006 | Chen | |
| 2006/0274498 A1 | 12/2006 | Chen | |
| 2008/0253077 A1 | 10/2008 | Miyamoto et al. | |
| 2009/0009961 A1 | 1/2009 | Li | |
| 2009/0021911 A1 | 1/2009 | Lee et al. | |
| 2009/0021912 A1 | 1/2009 | Yin | |
| 2009/0152216 A1 * | 6/2009 | Champion | G06F 1/183 |
| | | | 211/26 |
| 2009/0257187 A1 | 10/2009 | Mills et al. | |
| 2010/0026148 A1 | 2/2010 | Zhang et al. | |
| 2010/0061051 A1 | 3/2010 | Cochrane | |
| 2010/0177487 A1 * | 7/2010 | Arshad | G06F 21/86 |
| | | | 361/737 |
| 2010/0232976 A1 | 9/2010 | Li | |
| 2012/0010754 A1 | 1/2012 | Matteson | |
| 2012/0063080 A1 | 3/2012 | Chou | |
| 2012/0113591 A1 | 5/2012 | Chuang | |
| 2012/0212893 A1 * | 8/2012 | Furuta | H05K 7/1489 |
| | | | 361/679.02 |
| 2012/0219413 A1 | 8/2012 | Charest | |
| 2012/0327599 A1 | 12/2012 | Dickinson | |
| 2013/0099645 A1 | 4/2013 | Hsieh et al. | |
| 2013/0265725 A1 | 10/2013 | Harvilchuck | |
| 2014/0055934 A1 | 2/2014 | Wu et al. | |
| 2014/0086732 A1 | 3/2014 | Kelaher et al. | |
| 2014/0108692 A1 | 4/2014 | Doglio et al. | |
| 2014/0113539 A1 | 4/2014 | Dickinson | |
| 2014/0211418 A1 | 7/2014 | Arreola | |
| 2014/0376172 A1 | 12/2014 | Love et al. | |
| 2015/0366096 A1 | 12/2015 | Bailey et al. | |
| 2016/0029506 A1 * | 1/2016 | Franklin | H05K 7/1488 |
| | | | 211/26 |
| 2016/0291646 A1 * | 10/2016 | Alvarado | G06F 1/20 |
| 2016/0360637 A1 * | 12/2016 | Harvilchuck | H05K 7/1491 |
| 2017/0071071 A1 * | 3/2017 | Tseng | H05K 7/1489 |

OTHER PUBLICATIONS

Wright, Ingrid D., Requirement for Restriction/Election, U.S. Appl. No. 14/672,845, The United States Patent and Trademark Office, dated Jul. 14, 2016.

Dravininkas, Adam, Non-Final Office Action, U.S. Appl. No. 14/675,116, The United States Patent and Trademark Office, dated Aug. 5, 2016.

Thaker, Nidhi Vivek, Non-Final Office Action, U.S. Appl. No. 14/673,032, The United States Patent and Trademark Office, dated Jun. 9, 2016.

Wright, Ingrid, Non-Final Office Action, U.S. Appl. No. 14/672,574, The United States Patent and Trademark Office, dated Aug. 1, 2016.

Thaker, Nidhi Vivek, Non-Final Office Action, U.S. Appl. No. 14/673,032, The United States Patent and Trademark Office, dated Mar. 28, 2017.

Dravinikas, Adam B., Notice of Allowance, U.S. Appl. No. 14/675,116, The United States Patent and Trademark Office, dated Mar. 2, 2017.

Thaker, Nidhi Vivek, Advisory Action, U.S. Appl. No. 14/673,032, The United States Patent and Trademark Office, dated Feb. 13, 2017.

Wright, Ingrid D., Final Office Action, U.S. Appl. No. 14/672,574, The United States Patent and Trademark Office, dated Feb. 23, 2017.

Thaker, Nidhi Vivek, Final Office Action, U.S. Appl. No. 14/673,032, The United States Patent and Trademark Office, dated Oct. 6, 2016, pp. 1-21.

Wright, Ingrid, Non-Final Office Action, U.S. Appl. No. 14/672,845, The United States Patent and Trademark Office, dated Nov. 7, 2016, pp. 1-15.

* cited by examiner

1U TO NXU EXPANDABLE SERVER CHASSIS USING INTERCHANGEABLE FLEXIBLE COVERS OF VARYING SIZE

BACKGROUND

1. Technical Field

This disclosure generally relates to information handling systems (IHS), and more particular to a modularly-assembled IHS and an enclosure of different configurable heights of IHSes.

2. Description of the Related Art

As the value and use of information continue to increase, individuals and businesses seek additional ways to process and store information. One option available to users is information handling systems (IHSes). An IHS generally processes, compiles, stores, and/or communicates information or data for business, personal, or other purposes, thereby allowing users to take advantage of the value of the information. Because technology and information handling needs and requirements vary between different users or applications, IHSes may also vary regarding what information is handled, how the information is handled, how much information is processed, stored, or communicated, and how quickly and efficiently the information may be processed, stored, or communicated. The variations in IHSes allow for IHSes to be general or configured for a specific user or specific use such as financial transaction processing, airline reservations, enterprise data storage, or global communications. In addition, IHSes may include a variety of hardware and software components that may be configured to process, store, and communicate information and may include one or more computer systems, data storage systems, and networking systems.

An original equipment manufacturer (OEM) of IHSes often assembles an IHS such as an individual server or a rack assembly including a number of rack servers. The OEM then ships the assembled individual server or the rack-assembled IHS to an end user destination. Often these IHSes are built to order. Numerous industry conditions can preclude assembling any particular configuration before an order is received from an end user. For example, the processor and other aspects of computer technology are rapidly evolving, the cost of certain compute components used in an IHS is subject to volatility, and customer requirements can have great variability. One implication of waiting for customer orders is that the utilization efficiency of the workforce at the OEM is subject to the vagaries in the amount of orders received.

Some end users are sophisticated in their understanding of IHSes and invest in a large number of IHSes for a data center facility. A large order can create a correspondingly large manufacturing delay at the OEM. However, the end user may have the space and personnel required to configure their IHSes onsite. Further, the end user may also have some motivation to select particular compute components to be used within the IHS. In addition, similar considerations can be applicable after deployment of the IHS, particularly for continued servicing and upgrading of the IHSes. Also, the end user may prefer to order chasses and compute components that can be economically and quickly shipped.

One particular limitation on configuring IHSes for use in standard racks is the correct sizing of the chassis of the individual server IHS being installed into the rack. Standardization of dimensions of rack servers fosters design and manufacturing economies for information technology (IT) components that are part of an IHS. One such standardization is on the height of a chassis inserted into a rack. For example, a chassis that is configured to house a server or a chassis configured for storage devices of a multiple chassis IHS can have a vertical height of one (1) rack unit, or 1U. Mounting infrastructure can also be configured for other multiples of 1U, such as 2U, 3U, 4U, etc. Functional computer components can have a vertical dimension that can support a 1U chassis or can require greater vertical spacing. The advantages of configuring an IHS at an end user destination can be offset by the increased work and inventory requirements to accommodate all of the permutations of required chassis heights and rack mounting infrastructure. Having a single chassis of sufficient height for all configurations would waste space in certain instances, which is undesirable when requirements are for dense storage. Conventional chasses are manufactured to a specific form factor (e.g., a 1U or some higher number other form factor, such as 2U or 3U. These chasses will accommodate only those components specifically manufactured for that specific form factor and will typically fit only in a rack configured to hold that specific form factor.

BRIEF SUMMARY

The illustrative embodiments of the present disclosure provides a chassis of an information handling system (IHS) including a base panel having an upper chassis surface to receive selected compute components and infrastructure components that can vary in height depending on the form factor (or final height dimension) desired for the fully assembled IHS or rack in which the IHS will be inserted. The chassis includes lateral guides to enable insertion into a receiving bay of an N×U rack, where N is a number equal to or greater than one. The chassis includes a selected one of (i) a first modular cover having peripheral sides of a first vertical height to create a first server enclosure of a first height that houses compute components of less than the first height and (ii) a second modular cover having peripheral sides of a different vertical height to create a second server enclosure of a second height to house compute components having a highest height component of less than the second height but greater than the first height. The chassis has a latching structure on the base panel and a complementary latching structure on each of the first modular cover and second modular cover to enable the base panel to be securely fixed to the selected one of the first modular cover and the second modular cover.

According to at least one aspect of the present disclosure, an IHS has selected compute components and infrastructure components that vary in form factor or final vertical height desired for the fully assembled IHS or rack in which the IHS will be inserted. The IHS includes a chassis configured with the infrastructure components arranged for housing the selected compute components. In one or more embodiments, the chassis includes a base panel having an upper chassis surface to receive the selected compute components and infrastructure components.

The chassis includes lateral guides to enable insertion into a receiving bay of an N×U rack, where N is a number equal to or greater than one. The chassis includes a selected one of (i) a first modular cover having peripheral sides of a first vertical height to create a first server enclosure of a first height that houses compute components of less than the first height and (ii) a second modular cover having peripheral sides of a different vertical height to create a second server enclosure of a second height to house compute components having a highest height component of less than the second height but greater than the first height. The chassis has a latching structure on the base panel and a complementary latching structure on each of the first modular cover and second modular cover to enable the base panel to be securely fixed to the selected one of the first modular cover and the second modular cover.

According to at least one aspect of the present disclosure, a method is provided of manufacturing a chassis that is provisioned with end-user selectable compute components to form a fully functional IHS. In one or more embodiments, the method includes manufacturing a base panel with an upper chassis surface to receive selected compute components and infrastructure components that vary in height depending on the form factor (or final height dimension) desired for the fully assembled IHS or rack in which the IHS will be inserted. The method includes forming a first modular cover having vertical height that enables creation a first server enclosure of a first height capable of housing compute components of less than the first height. The method includes forming a second modular cover having sides of second vertical height that enables creation of a second server enclosure of a second height to house compute components of less than the second height but greater than the first height. The method includes receiving selected compute components in the base panel with a highest height component being either less than the first height or greater than the first height, but less than the second height to correspond respectively to the first modular cover and the second modular cover. The method includes selecting an appropriate one of the first modular cover and the second modular cover and engaging a latching structure between the selected modular cover and the base panel to house the selected compute components. The method further includes attaching a rack glide to the base panel to allow the assembled chassis of either the first height or the second height to be supported when inserted into a standard server rack. In one embodiment the method further includes notching the top side surface as of the second modular cover at a height corresponding to a next upper rack glide to enable the chassis configured at the second height to bypass and not contact the next upper rack glides when the chassis is slid into the rack.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DETAILED DESCRIPTION

Figure 1:
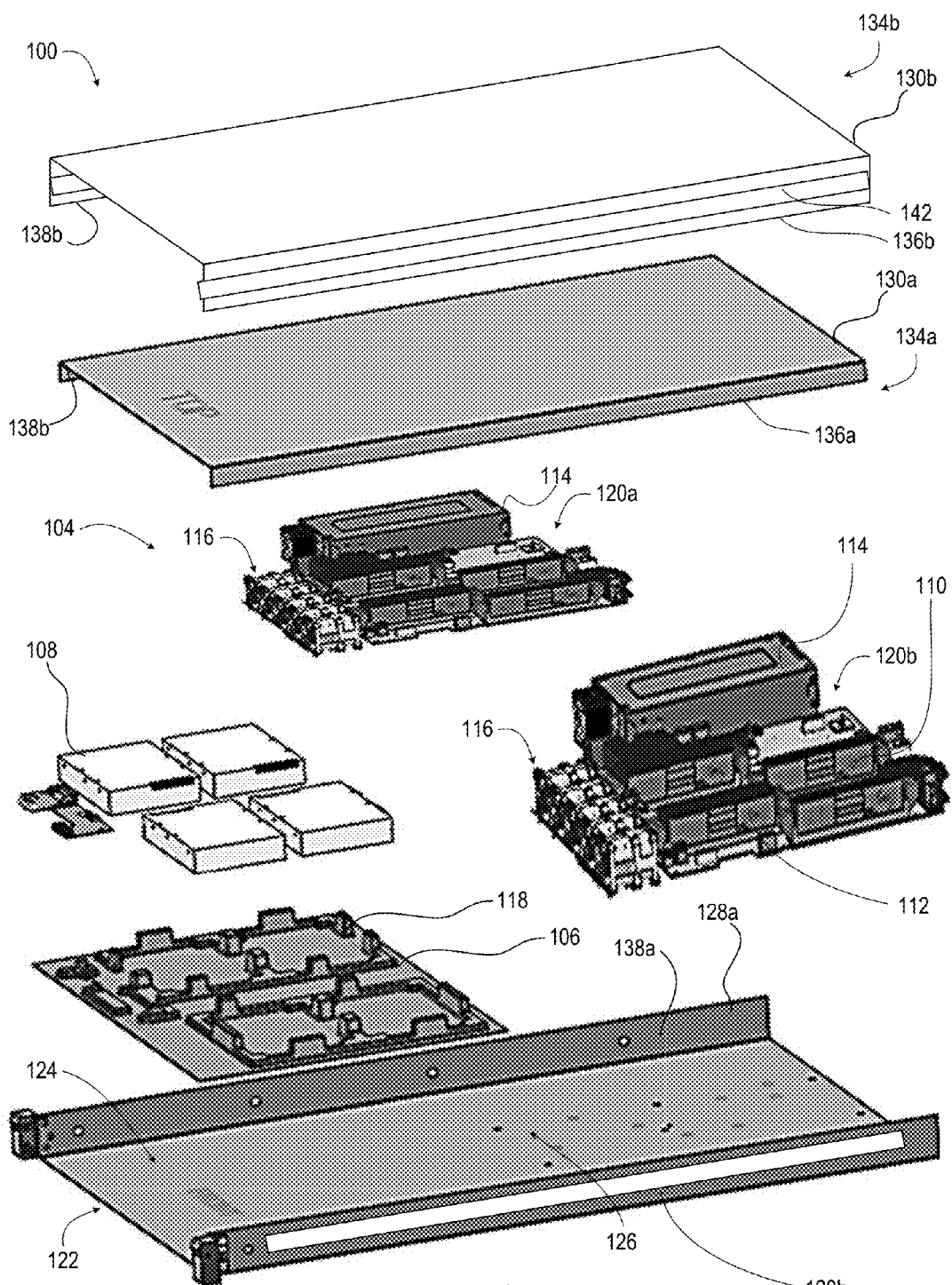
FIG. 1 illustrates perspective view of a disassembled Information Handling System (IHS) that can be configured with functional computer components of different heights, according to one or more embodiments.

An Information Handling System (IHS) includes a chassis having a base panel with lateral guides, a selected modular cover, and a latching structure. The base panel has an upper chassis surface to receive selected compute components and infrastructure components that vary in height depending on the form factor (or final height dimension) desired for the fully assembled IHS or rack in which the IHS will be inserted. The selected modular cover can have peripheral sides of a vertical height to complement a vertical height of the lateral guides of the base panel to create either a first height enclosure of a first height to house compute components of less than the first height or a second height enclosure of a second height to house compute components of less than the second height but greater than the first height. The latching structure is formed between the peripheral sides of the selected one of the first and second modular cover and the lateral guides of the base panel.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates an IHS 100 that includes selected compute components that have varying heights. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In the illustrative embodiment of FIG. 1, IHS 100 has functional computer components 104 that include selected compute components and infrastructure components 106 that vary in height being between less than the threshold height and equal to or greater than the threshold height. In the described embodiment, the threshold height refers to a base height of the assembled chassis and is directly correlated to the 1U height of a standard server rack. Selected compute components can include storage drives 108, processors 110, and memory cards 112. Infrastructure components 106 can include power supply units (PSUs) 114, air movers 116 and modular support trays 118. For clarity, first and second configurations 120a, 120b are, respectively, of a first vertical height such as 1U rack units and a second vertical height such as 2U rack units.

A chassis 122 of the IHS 100 is configured with the infrastructure components, such as the modular support tray 118, arranged for housing the selected compute components. The chassis 122 can include a base panel 124 having an upper chassis surface 126 to receive selected compute components and infrastructure components 106 that vary in form, factor or final vertical height desired for the fully assembled IHS 100 or rack in which the IHS 100 will be inserted. First and second lateral guides 128a, 128b are attached to the base panel 124 for insertion into a receiving bay of an N×U rack, where N is a number equal to or greater than one. A first modular cover 130a has peripheral sides 136a of a first vertical height to complement a vertical height to create a first server enclosure 134a of a first height that houses compute components having a highest height component of less than the first height. A second modular cover 130b has peripheral sides 136b of a different vertical height to create a second server enclosure 134b of a second height to house compute components of less than the second height but greater than the first height. A selected one of a first modular cover 130a and a second modular cover 130b can accommodate, respectively, the first and second configurations 120a, 120b. A latching structure 138a can be formed on the base panel 124 and a complementary latching structure 138b on each of the first modular cover 130a and the second modular cover 130b.

In one or more embodiments, the IHS 100 is configured for use in a rack having guides at each 1U location. The second modular cover 130b can include notched top side surfaces 142 of the peripheral sides 136a, 136b to bypass opposing protrusions/affordances of an IHS rack for interconnecting with first and second lateral guides 128a, 128b of a server chassis 122.

Figure 2:
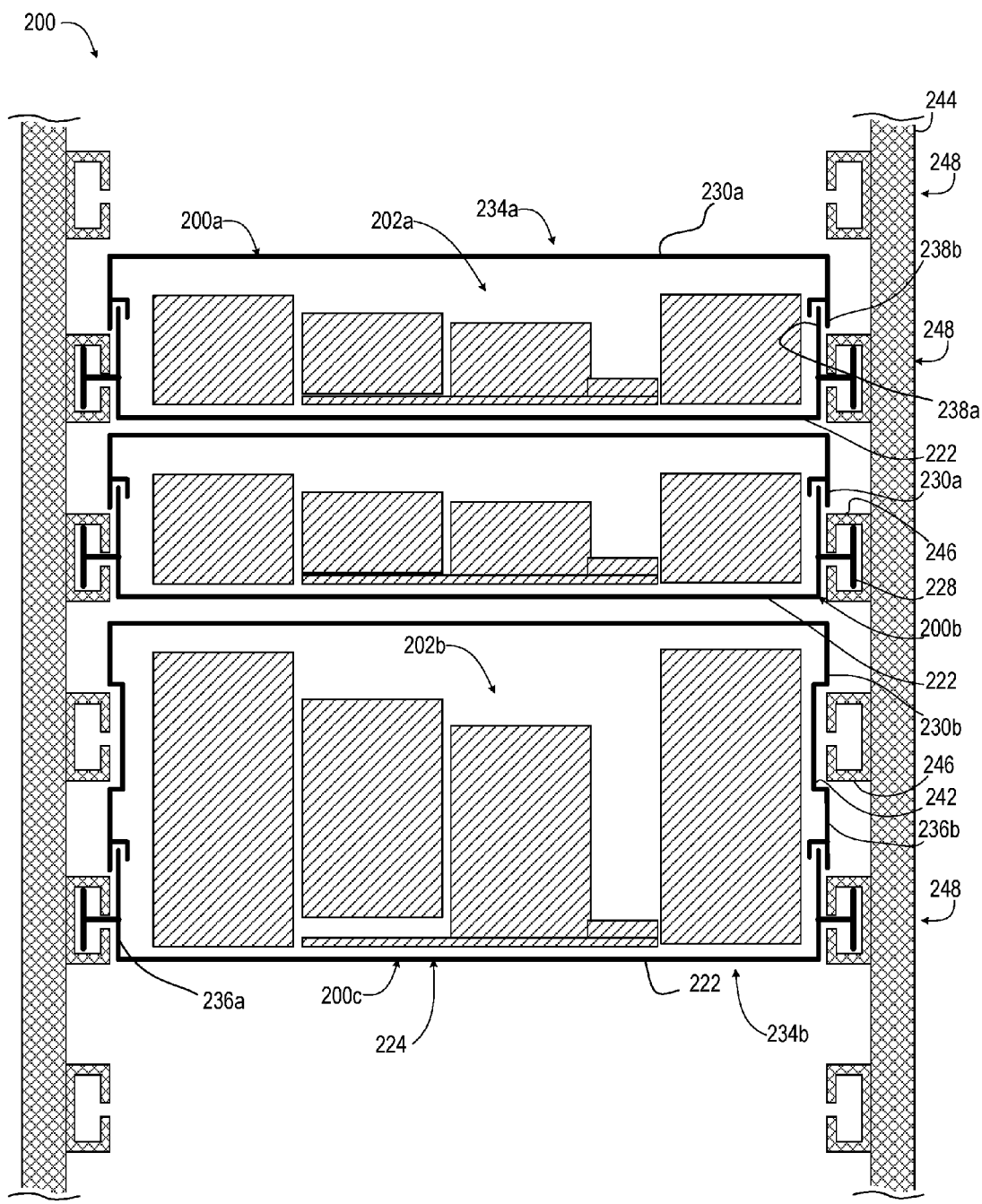
FIG. 2 illustrates a conceptual diagram in side cross sectional view of example rack-mounted IHSes that include selected modular covers to create chasses of appropriate height for the functional computer components inserted into the respective chassis, according to one or more embodiments.

FIG. 2 illustrates a multiple-chassis IHS 200 that includes IHSes 200a, 200b that are of the first vertical height to accommodate compute components 202 that are less than the first vertical height and an IHS 200c that is of the second vertical height to accommodate compute components 202 that are less than the second vertical height but greater than the first vertical height. IHSes 200a-200c are mounted into a rack 244 by inserting lateral guides 228 into respective rack mounting glides 246 that are vertically spaced 1U apart. IHSes 200a-200b have a first modular cover 230a that provides first height enclosure 234a that remains within the respective 1U slot 248 without interfering with another rack mounting glide 246. IHS 200c has the second modular cover 230b that provides a second height enclosure 234b greater than 1U, with notched top side surface 242 of the peripheral sides 236a, 236b to avoid the rack mounting glides 246 of an IHS rack 244. The first and second modular covers 230a, 230b can be formed from a flexible material. The second modular cover 230b can have a notched top side surface 242 at a height corresponding to a next upper rack mounting glide 246 to enable the chassis 222 configured at the second height to bypass and not contact the next upper rack mounting glides 246 when the chassis 222 is slid into the rack 244. A latching structure 238a is formed on the base panel 224. A complementary latching structure 238b is formed on each of the first modular cover 230a and the second modular cover 230b.

Figure 3:
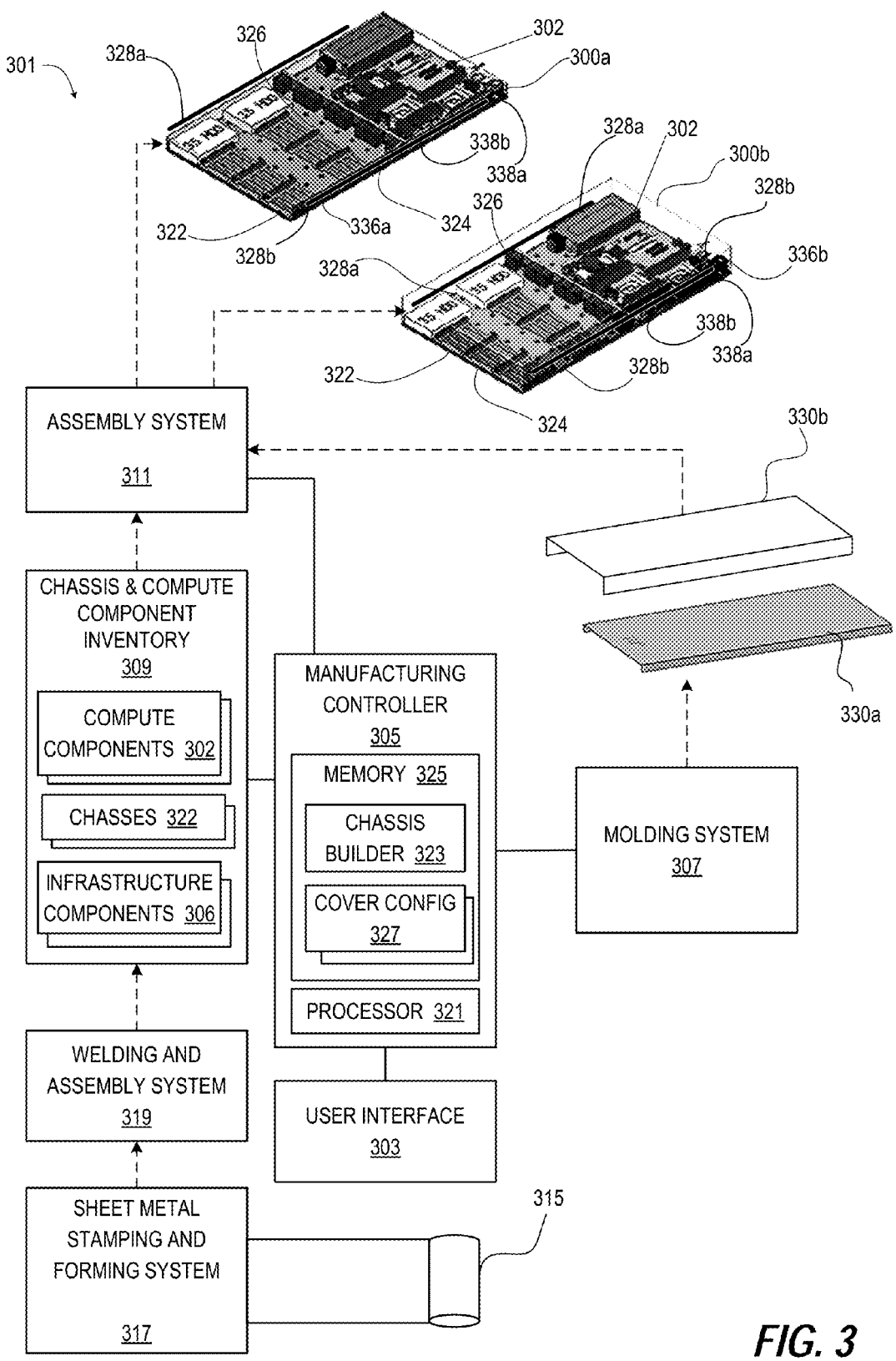
FIG. 3 illustrates aspects of the manufacturing process for manufacturing the IHSes of FIG. 2, according to one or more embodiments.

FIG. 3 illustrates a manufacturing system 301 having a user interface 303 that can initiate a manufacturing controller 305 to control manufacturing of a chasses 322 with first and second modular covers 330a, 330b that are provisioned with and appropriate for the vertical height for end-user selectable compute components 302 to form a fully functional IHS 300a, 300b. For clarity, the manufacturing controller 305 can control a molding system 307, a chassis and compute component inventory 309, and an assembly system 311. In one or more embodiments, certain processes can be distributed. Components that are not molded such as chasses 322 can be formed from rolled sheet metal 315 that is processed in a sheet metal stamping and forming system 317 into components that are further processed in a welding and assembly system 319 that are provided to the chassis and compute component inventory 309 for assembly with the compute components 302 and covers 330a, 330b.

The manufacturing controller 305 can execute on a processor 321 a chassis builder utility 323 that is resident in memory 325 along with cover configurations 327 to manufacture IHSes 300a-300b. In particular, the manufacturing controller 305 can control the sheet metal stamping and sheet metal stamping and forming system 317 and welding and assembly system 319 to manufacture a base panel 324 with an upper chassis surface 326 to receive selected compute components 302 and infrastructure components 306 that vary in height depending on the form factor or final height dimension desired for the fully assembled IHS 300a-300b or rack in which the IHS 300a-300b will be inserted. The manufacturing controller 305 can control the sheet metal stamping and forming system 317 and welding and assembly system 319 to form lateral guides 328a-328b to enable insertion into a receiving bay of an N×U rack, where N is a number equal to or greater than one. The manufacturing controller 305 can control the molding system 307 to form a first modular cover 330a having peripheral sides 336a of a first vertical height that enables creation of a first server enclosure of a first height to house compute components of less than the first height. The manufacturing controller 305 can control the molding system 307 to form a second modular cover having peripheral sides 336b of a different vertical height that enables creation a second server enclosure of a second height to house compute components of less than the second height but greater than the first height. The manufacturer controller 305 can cause the assembly system 311 to receive selected compute components 302 in the base panel 324 of one of less than the first height and the second height to correspond respectively to the first modular cover 330a and the second modular cover 330b. The manufacturer controller 305 can cause the assembly system 311 to select an appropriate one of the first modular cover 330a and the second modular cover 330b and to engage a latching structure 338a on the base panel 324 and a complementary latching structure 338b on each of the first modular cover 330a and the second modular cover 330b to securely fix the base panel 324 to the selected one of the first modular cover 330a and the second modular cover 330b.

Figure 4:
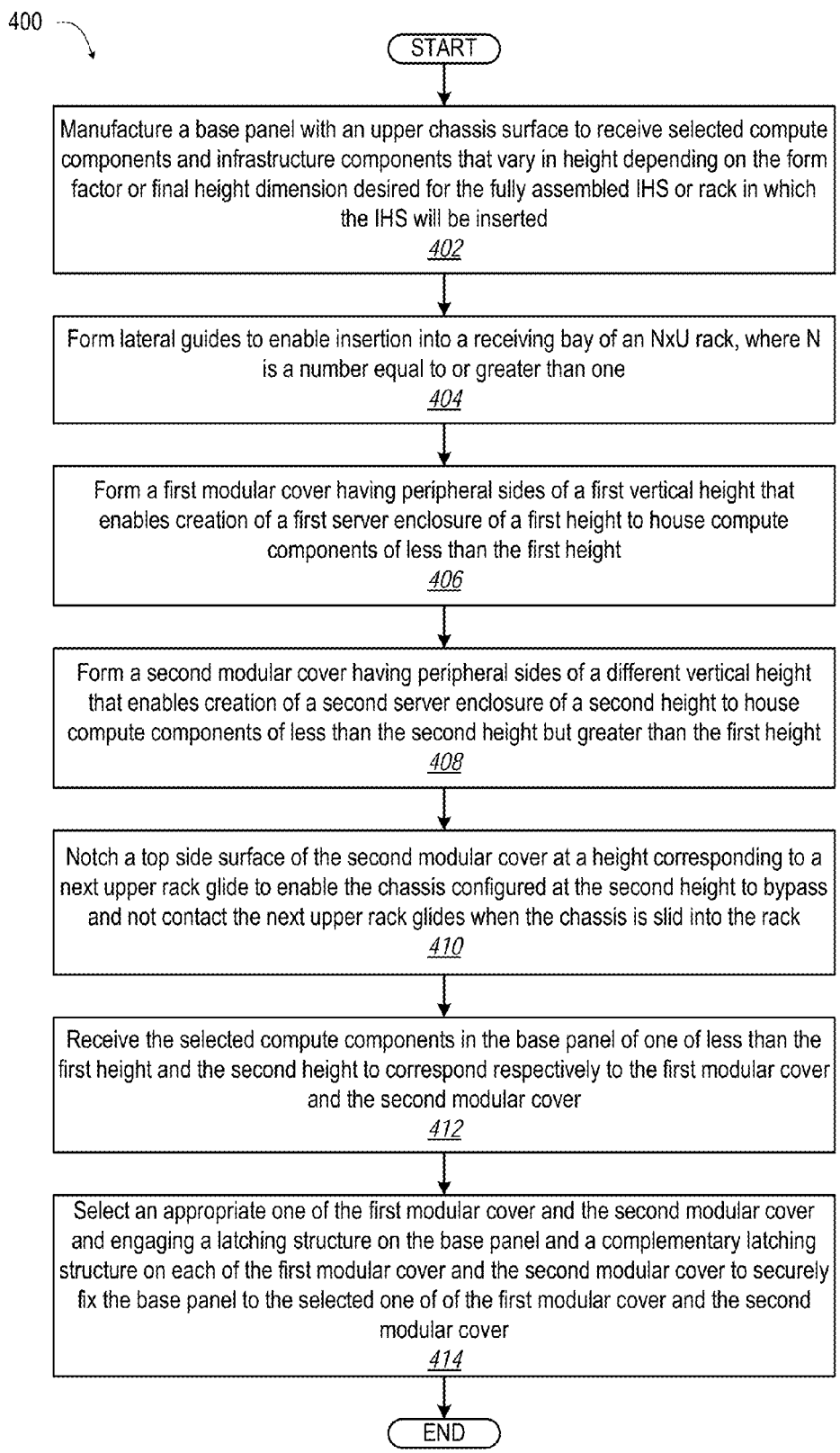
FIG. 4 illustrates a flow diagram of a method of manufacturing IHSes with modularly configured chassis of different form factors using a same base panel, according to one or more embodiments.

FIG. 4 illustrates a method 400 of manufacturing a chassis that is provisioned with selectable compute components to form a fully functional IHS. In one or more embodiments, the method 400 includes manufacturing a base panel with an upper chassis surface to receive selected compute components and infrastructure components that vary in height depending on the form factor or final height dimension desired for the fully assembled IHS or rack in which the IHS will be inserted (block 402). The method 400 includes forming lateral guides to enable insertion into a receiving bay of an N×U rack, where N is a number equal to or greater than one (block 404). The method 400 includes forming a first modular cover having peripheral sides of a first vertical height that enables creation of a first server enclosure of a first height to house compute components of less than the first height (block 406). In one or more embodiments, the method 400 includes forming a second modular cover having peripheral sides of a different vertical height that enables creation of a second server enclosure of a second height to house compute components of less than the second height but greater than the first height (block 408). In one or more embodiments, the method 400 includes notching a top side surface of the second modular cover at a height corresponding to a next upper rack glide to enable the chassis configured at the second height to bypass and not contact the next upper rack glides when the chassis is slid into the rack (block 410). The method 400 includes receiving the selected compute components in the base panel of one of less than the first height and the second height to correspond respectively to the first modular cover and the second modular cover (block 412). The method 400 includes selecting an appropriate one of the first modular cover and the second modular cover and engaging a latching structure on the base panel and a complementary latching structure on each of the first modular cover and the second modular cover to securely fix the base panel to the selected one of the first modular cover and the second modular cover (block 414). In one or more embodiments, the latching structure can be a snap-fit engaging surface on one of the peripheral sides of the selected one of the first and second modular cover and the lateral guide of the base panel. In one or more embodiments, the first and second modular covers can be formed by molding flexible covers. In one or more embodiments, the first and second modular covers can be formed from biodegradable material. In one or more embodiments, the first modular cover and the base panel form the first height enclosure of 1U height and the second modular cover and the base panel form the second height enclosure of 2U height. The base panel can include external rack mounting guides that enable insertion of the chassis into a 1U slot or a 2U slot of an IHS rack. Then method 400 ends.

In the above described flow chart of FIG. 4, one or more of the methods may be embodied in an automated manufacturing system that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A chassis of an Information Handling System (IHS), the chassis comprising: a base panel having an upper chassis surface to receive selected compute components and infrastructure components that can vary in form factor or final vertical height desired for the fully assembled IHS or rack in which the IHS will be inserted, the final vertical height being selectable from among a first height and a second height greater than the first height; lateral guides to enable insertion into rack glides of a receiving bay of an N×U rack, where N is a number greater than one; a modular cover having peripheral sides of a vertical height to create a server enclosure of the second height, the server enclosure housing compute components of less than the second height but greater than the first height, wherein the modular cover comprises a notched top side surface at a height corresponding to a next upper rack glide to enable the chassis, configured at the second height, to extend above, but not contact the next upper rack glide when the chassis is slid into the rack using a lower rack glide; and a latching structure on the base panel and a complementary latching structure on the modular cover.

2. The chassis of claim 1, wherein the modular cover is a second modular cover, and the chassis base panel is configured to support use of a first modular cover having peripheral sides of a first vertical height to create a first server enclosure of a first height that houses compute components having a highest height component of less than the first height, wherein the first modular cover and the base panel form a first server enclosure of 1U height and wherein the second modular cover and the base panel form a second server enclosure of 2U height.

3. The chassis of claim 2, wherein the lateral guides enable insertion of the chassis into a 1U slot or a 2U slot of an IHS rack.

4. The chassis of claim 2, wherein the first and second modular covers each comprise a flexible molded cover.

5. The chassis of claim 4, wherein the first and second modular covers comprise biodegradable material.

6. The chassis of claim 2, wherein the latching structure comprises a snap-fit engaging surface on one of the peripheral sides of the selected one of the first and second modular cover and the lateral guide of the base panel.

7. An information handling system (IHS) comprising: selected compute components and infrastructure components that can vary in form factor or final vertical height desired for the fully assembled IHS or rack in which the IHS will be inserted, the final vertical height being selectable from among a first height and a second height greater than the first height; and a chassis comprising: a base panel having an upper chassis surface to receive the selected compute components and infrastructure components; lateral guides to enable insertion into rack glides of a receiving bay of an N×U rack, where N is a number greater than one; a modular cover having peripheral sides of a vertical height to create a server enclosure of the second height, the server enclosure housing compute components of less than the second height but greater than the first height, wherein the modular cover comprises a notched top side surface at a height corresponding to a next upper rack glide to enable the chassis, configured at the second height, to extend above, but not contact the next upper rack glide when the chassis is slid into the rack using a lower rack glide; and a latching structure on the base panel and a complementary latching structure on the modular cover.

8. The IHS of claim 7, wherein the modular cover is a second modular cover, and the chassis base panel is configured to support use of a first modular cover having peripheral sides of a first vertical height to create a first server enclosure of a first height that houses compute components having a highest height component of less than the first height, wherein the first modular cover and the base panel form the first server enclosure of 1U height, and wherein the second modular cover and the base panel form the second server enclosure of 2U height.

9. The IHS of claim 7, further comprising an IHS rack configured with at least one of a 1U slot and a 2U slot, wherein the lateral guides enable insertion into the 1U slot or the 2U slot of the IHS rack.

10. The IHS of claim 8, wherein the first and second modular covers each comprise a flexible molded cover.

11. The IHS of claim 8, wherein the latching structure comprises a notched top side surface of the second modular cover at a height corresponding to a next upper rack glide to enable the chassis configured at the second height to bypass and not contact the next upper rack glides when the chassis is slid into the rack.

* * * * *